(12) United States Patent
Asazu et al.

(10) Patent No.: US 7,747,696 B2
(45) Date of Patent: Jun. 29, 2010

(54) CONTENT-RELATED INFORMATION PROVIDING APPARATUS, CONTENT RELATED INFORMATION PROVIDING METHOD, ELECTRONIC BULLETIN BOARD SYSTEM, AND COMPUTER PROGRAM

(75) Inventors: Hideki Asazu, Tokyo (JP); Tomoyuki Yamamoto, Kanagawa (JP); Kohei Endo, Saitama (JP); Katsuro Matsuzaki, Kanagawa (JP); Yasushi Tsuruta, Tokyo (JP)

(73) Assignee: Sony Corporation, Tokyo (JP)

( * ) Notice: Subject to any disclaimer, the term of this patent is extended or adjusted under 35 U.S.C. 154(b) by 760 days.

(21) Appl. No.: 10/518,576

(22) PCT Filed: Jun. 16, 2003

(86) PCT No.: PCT/JP03/07597

§ 371 (c)(1),
(2), (4) Date: Jul. 1, 2005

(87) PCT Pub. No.: WO2004/003756

PCT Pub. Date: Jan. 8, 2004

(65) Prior Publication Data

US 2006/0156335 A1 Jul. 13, 2006

(30) Foreign Application Priority Data

Jun. 26, 2002 (JP) ............................. 2002-186787

(51) Int. Cl.
*G06F 15/16* (2006.01)
*H04N 7/10* (2006.01)
*H04N 7/173* (2006.01)
*H04Q 11/00* (2006.01)

(52) U.S. Cl. .................... 709/217; 709/219; 725/32; 725/35; 725/114

(58) Field of Classification Search ................. 709/217, 709/219; 725/86, 32, 35, 114
See application file for complete search history.

(56) References Cited

U.S. PATENT DOCUMENTS 6,088,455 A * 7/2000 Logan et al. ................ 380/200

(Continued)

FOREIGN PATENT DOCUMENTS

JP 7-147657 6/1995

(Continued)

OTHER PUBLICATIONS

Tomokazu Murakami, et al., "An Integrated System of Internet Environment and TV Broadcasting for Chatting and Searching of TV Contents Related Documents", The Institute of Electronics, Information and Communication Engineers, vol. 101, No. 494, Dec. 6, 2001, 2 cover pages and pp. 43-48 (with English abstract). Ax.

*Primary Examiner*—William C Vaughn, Jr.
*Assistant Examiner*—Muktesh G Gupta
(74) *Attorney, Agent, or Firm*—Oblon, Spivak, McClelland, Maier & Neustadt, L.L.P.

(57) ABSTRACT

Each bulletin board is set for the purpose of an argument and information exchange concerning a specific television program. In writing a remark in the bulletin board, a user registers information for specifying a program/scene referred to by the remark together with remark contents. The reference information consists of a broadcasting station at the time when a program is broadcasted and time when a reference part is broadcasted. The reference information is shaped into a predetermined format and transmitted to a terminal apparatus of the user. In the terminal apparatus, it becomes possible to start reproduction of a pertinent program/scene from recorded contents on the based on the received reference information. The terminal apparatus can support creation of information such as a comment concerning each scene in program contents and transmission and reception work of this type of information.

39 Claims, 14 Drawing Sheets

U.S. PATENT DOCUMENTS

| | | | |
|---|---|---|---|
| 6,173,317 B1* | 1/2001 | Chaddha et al. | 709/219 |
| 6,463,585 B1* | 10/2002 | Hendricks et al. | 725/35 |
| 6,493,872 B1* | 12/2002 | Rangan et al. | 725/32 |
| 6,931,451 B1* | 8/2005 | Logan et al. | 709/231 |
| 6,961,555 B1* | 11/2005 | Philyaw | 455/403 |
| 7,028,324 B2* | 4/2006 | Shimizu et al. | 725/32 |
| 7,055,166 B1* | 5/2006 | Logan et al. | 725/32 |
| 7,095,450 B1* | 8/2006 | Holmes et al. | 348/586 |
| 7,143,066 B2* | 11/2006 | Shear et al. | 705/54 |
| 7,143,428 B1* | 11/2006 | Bruck et al. | 725/37 |
| 7,168,084 B1* | 1/2007 | Hendricks et al. | 725/42 |
| 2002/0053078 A1* | 5/2002 | Holtz et al. | 725/14 |
| 2003/0037335 A1* | 2/2003 | Gatto et al. | 725/86 |
| 2003/0046689 A1* | 3/2003 | Gaos | 725/34 |
| 2003/0093790 A1* | 5/2003 | Logan et al. | 725/38 |

FOREIGN PATENT DOCUMENTS

| | | |
|---|---|---|
| JP | 9-101928 | 4/1997 |
| JP | 11-53389 | 2/1999 |
| JP | 11-88863 | 3/1999 |
| JP | 11-143912 | 5/1999 |
| JP | 11-196389 | 7/1999 |
| JP | 11-252471 | 9/1999 |
| JP | 2000-197032 | 7/2000 |
| JP | 2001-43215 | 2/2001 |
| JP | 2001-76007 | 3/2001 |
| JP | 2001-333411 | 11/2001 |
| JP | 2001-344172 | 12/2001 |
| JP | 2002-33968 | 1/2002 |
| JP | 2002-84484 | 3/2002 |
| JP | 2002-152694 | 5/2002 |
| JP | 2002-175311 | 6/2002 |
| JP | 2003-150529 | 5/2003 |

* cited by examiner

FIG. 3

| BULLETIN BOARD OF ○○ | | ← PREVIOUS REMARK  NEXT REMARK → | |
|---|---|---|---|
| CONTRIBUTION DATE | CONTRIBUTOR | CONTENT | SEE PERTINENT SCENE |
| 1/14 23:13 | AKKUN | WHERE IS A LOCATION SITE OF THIS SCENE? | 1/14 00:07:31 |
| 1/14 23:15 | KEROCHAN | PROBABLY, SHINAGAWA INTER CITY | --- |
| 1/21 23:10 | KEROCHAN | STORY DEVELOPS SUDDENLY THIS WEEK, DOESN'T IT? BY THE WAY, THIS SCENE IS ABRUPT. IS THIS A HINT OF SOMETHING? | 1/21 00:24:11 |
| ⋮ | ⋮ | ⋮ | ⋮ |

301

WRITE REMARK IN BULLETIN BOARD — 302

RECORDING RESERVATION FOR NEXT BROADCAST — 303

RETURN TO LIST OF BULLETIN BOARDS    RETURN TO TOP PAGE

FIG. 4

RETRIEVE REMARK

401 — ☑ SEARCH BY KEYWORD

402 — KEYWORD: [          ]

403 — ☐ SEARCH BY PERSON MAKING REMARK

404 — PERSON MAKING REMARK: [          ]

405 — ☐ SEARCH BY REMARK CONTRIBUTION DATE

406 — CONTRIBUTION DATE: 2002 ▼  ☐ ☐ ☐  ☐ FROM ...
                         2002 ▼  ☐ ☐ ☐  ☐ TO ...

[RETRIEVE] [CLEAR]

RETURN TO LIST OF BULLETIN BOARD    RETURN TO TOP PAGE

*FIG. 7*

```
1:   Content-Type: application/-xvzine-jump; charset=shift_jis
2:   Version: 1
3:   Station: xx BROADCASTING STATION
4:   Channel: 10
5:   Year: 2002
6:   Month: 1
7:   Date: 14
8:   Origin: 22:00:00.0
9:   Offset: 00:07:31.0
10:  Board-name: BULLETIN BOARD OF ○○
11:  Lines: 1
12:
13:  WHERE IS A LOCATION SITE OF THIS SCENE?
```

FIG. 9

901 — CONTENT:

902 — ☑ REFER TO SCENE

903 — BROADCAST DATE: JANUARY 14 ▼

904 — REFERENCE POSITION: ☐ HOUR ☐ MIN. ☐ SEC.

※ PLEASE INPUT RELATIVE TIME FROM TOP OF PROGRAM

[WRITE] [CLEAR]

RETURN TO LIST OF BULLETIN BOARDS    RETURN TO TOP PAGE

REMARK IN "BULLETIN BOARD OF ○○"

FIG. 12

```
1:    .....
2:    <object
3:    classid="clsid: 12345ABC-1A2B-3D4F-1234-000000000001"
4:    .....
5:    <param name="date" value="2002/01/14 22:00-22:45"/>
6:    <param name="date" hvalue="2002/01/21 22:00-22:45"/>
7:    .....
8:    <param url="http://www.keijiban.example/post/?board-id=200"/>
9:    object>
10:   .....
```

FIG. 13

BULLETIN BOARD TABLE (201)

| ID | BULLETIN BOARD NAME | PROGRAM SERIES ID |
|---|---|---|
| 200 | BULLETIN BOARD OF ○○ | 10 |
| 201 | BULLETIN BOARD OF □□ | 11 |
| 202 | BULLETIN BOARD OF △△ | 12 |

PROGRAM SERIES TABLE (202)

| ID | SERIES TITLE |
|---|---|
| 10 | ○○ |
| 11 | □□ |
| 12 | △△ |

REMARK TABLE (203)

| ID | ID OF PERSON MAKING REMARK | BULLETIN BOARD ID | CONTRIBUTION DATE | REMARK | REFERENCE INFORMATION ID |
|---|---|---|---|---|---|
| 1 | 1432 | 200 | 2002/01/14 23:13:21 | WHERE IS LOCATION SITE OF THIS SCENE? | 1 |
| 2 | 2121 | 200 | 2002/01/14 23:15:23 | PROBABLY, SHINAGAWA INTER CITY | NULL |
| 3 | 7231 | 202 | 2002/01/15 00:01:05 | THIS ACTOR (ACTRESS) PLAYS SUCH A ROLE RECENTLY, ISN'T HE (SHE)? | 2 |

REFERENCE INFORMATION TABLE (204)

| ID | REFERENCE POSITION | PROGRAM ID |
|---|---|---|
| 1 | 00h07m31s | 134 |
| 2 | 00h34m24s | 158 |
| 3 | 00h14m05s | 231 |

PROGRAM TABLE (1301)

| ID | PROGRAM TITLE | SERIES ID | SERIAL NUMBER IN SERIES | AFFILIATED NETWORK | BROADCAST START DATE AND TIME | BROADCAST END DATE AND TIME |
|---|---|---|---|---|---|---|
| 134 | ○○ (THIRD EPISODE) | 10 | 3 | ANN | 2002/01/14 22:00 | 2002/01/14 22:45 |
| 135 | ○○ (FOURTH EPISODE) | 10 | 4 | ANN | 2002/01/14 22:45 | 2002/01/14 23:00 |
| 136 | □□ (EIGHTH EPISODE) | 11 | 8 | ANN | 2002/01/14 23:00 | 2002/01/14 23:55 |

STATION-REGION RELATION TABLE (1302)

| AFFILIATED NETWORK | BROADCASTING STATION NAME | REGION CODE | CHANNEL NUMBER |
|---|---|---|---|
| ANN | ○○ BROADCASTING STATION | A001 | 1 |
| ANN | ○○ BROADCASTING STATION | A002 | 3 |
| FNN | TELEVISION xx | A001 | 10 |

US 7,747,696 B2

CONTENT-RELATED INFORMATION PROVIDING APPARATUS, CONTENT RELATED INFORMATION PROVIDING METHOD, ELECTRONIC BULLETIN BOARD SYSTEM, AND COMPUTER PROGRAM

TECHNICAL FIELD

The present invention relates to a content related information provision apparatus and a content related information provision method, a bulletin board system, as well as a computer program that provide information related to contents consisting of sounds and videos through a network. In particular, the invention relates to a content related information provision apparatus and a content related information provision method, a bulletin board system, as well as a computer program that provide information on contents that are delivered in accordance with a scheduled time of a broadcast program to be delivered from a broadcasting station or the like.

More specifically, the invention relates to a content related information provision apparatus and a content related information provision method, a bulletin board system, as well as a computer program that support sharing of information such as remarks concerning respective scenes in program contents on the air or recorded program contents among users. In particular, the invention relates to a content related information provision apparatus and a content related information provision method, a bulletin board system, as well as a computer program that support creation of information such as remarks concerning respective scenes in program contents and transmission and reception work for this kind of information.

BACKGROUND ART

According to development of the digital technology, it has become possible to store a large quantity of AV data consisting of videos and sounds. Recently, it has become possible to acquire a HDD (Hard Disk Drive), which has a capacity of several tens GB or more, at relatively low cost, and a recording machine on an HDD basis, a personal computer (PC) having a function for recording and viewing a television program, and the like have appeared.

The HDD is a device that is capable of performing random access to recorded data. Therefore, when recorded contents are reproduced, unlike the case of a conventional video tape, it is unnecessary to simply reproduce recorded programs from one at the top in order, and it is possible to start reproduction directly from a favorite program (or a specific scene or a specific corner in a program).

However, according to an increase in a capacity of the HDD, when a large number of programs are stored therein, a user is worried about selection of contents to decide which program the user should view first. It is considered necessary to perform some viewing support in order to prevent dead stock of contents that the user stored steadily and realize effective utilization of the contents.

On the other hand, in the modern society in which computerization has highly advanced, various kinds of information are digitized, and sharing and distribution of the information through a network are realized. Therefore, it is possible to share own knowledge and experiences among an indefinite number of users. Various bulletin board systems (BBSs) are established on the Internet and an indefinite number of users write comments in the bulletin board systems voluntarily, whereby the users can exchange issues and opinions concerning same themes.

For example, bulletin board systems on the Internet concerning television programs are already present, general people can criticize a broadcasted program through writing, and other people can inspect the criticism.

However, even if a user intends to refer to information on a specific scene in a bulletin board system concerning a television program, there are circumstances as described below.
(1) Means for setting a link with a program is not provided.
(2) Since a broadcast schedule is fixed, a program cannot always be viewed.
(3) It is not allowed to copy or digitize a broadcasted program without a permission of a rightful person to insert the program on a site.

Consequently, in an information provision site or a bulletin board system, there is no other way but to explain a program, which a user intends to refer to, or a specific scene in the program.

DISCLOSURE OF THE INVENTION

It is an object of the invention to provide an excellent content related information provision apparatus and an excellent content related information provision method, an excellent bulletin board system, as well as an excellent computer program that preferably support sharing of information such as remarks concerning respective scenes in program contents on the air or recorded program contents among users.

It is another object of the invention to provide an excellent content related information provision apparatus and an excellent content related information provision method, an excellent bulletin board system, as well as an excellent computer program that can preferably support creation of information such as remarks concerning respective scenes in program contents and transmission and reception work for this kind of information.

It is still another object of the invention to provide an excellent content related information provision apparatus and an excellent content related information provision method, an excellent bulletin board system, as well as an excellent computer program that can realize a mechanism in which, while reading a remark in a bulletin board system, a user searches a program or a scene referred to by the remark out of contents stored in a PC or a video recording machine for home use and views the program or the scene or views a program or a scene related to specific WWW contents in the same manner.

The invention has been devised taking into account the above-mentioned problems, and a first aspect thereof is a content related information provision apparatus or a content related information provision method that provides related information on contents consisting of reference data arranged in time series, characterized by including:

related information storing means for or a related information storing step of storing related information on contents;

reference information storing means for or a reference information storing step of storing reference information that specifies contents to be referred to by the related information and a data reference position in the contents; and information delivering means for or an information delivering step of delivering related information and/or reference information.

According to the content related information provision apparatus or the content related information provision method in accordance with the first aspect of the invention, it becomes possible to perform information provision to a user while referring to a specific part of contents without waiting for copying of contents such as videos and sounds on a server side that provides content related information.

The content related information provision apparatus or the content related information provision method in accordance with the first aspect of the invention may further includes: means for or a step of specifying an installation region of a terminal apparatus to be a delivery destination according to the information delivering means or the information delivering step; and information changing means for or an information changing step of changing contents of related information and/or reference information, which should be delivered, according to the installation region. In such a case, a difference of a delivery system or a delivery time for contents depending upon a region can be absorbed. In addition, it becomes possible to provide information adapted to each region.

The contents referred to in this context mean, for example, a broadcast program that a broadcasting station broadcasts in accordance with a program schedule. In addition, the reference information includes information specifying a broadcasting station, which broadcasts or has broadcasted a program, information specifying a date and time when a reference part in a program is broadcasted or has been broadcasted, and the like. In particular, with the reference information, it is possible to perform information provision referring to a broadcast program.

The reference information may specify a broadcasting station, which broadcasts or has broadcasted a program, using a channel number. In such a case, on a terminal apparatus side receiving the reference information, it becomes unnecessary to hold complicated information such as a list of broadcasting station names and broadcasting station IDs. In addition, since a mechanism for updating and maintaining such a list becomes unnecessary, design of a terminal apparatus can be performed simply and at low cost.

In addition, the reference information may further include information for specifying a broadcast starting date and time of the program and information for specifying a broadcast end time of a program or a length of the program. In such a case, before broadcast of the program, it becomes possible to perform recording reservation for the program in a terminal apparatus. In addition, for a side providing information, it becomes possible to perform information provision seamlessly before and after broadcast of a program.

The information delivering means or the information delivering step may include a URL concerning a WWW site handling information resources related to contents in the reference information and deliver the URL. In such a case, on a terminal apparatus side having received the reference information, it becomes possible to inspect another kind of information related to the contents on the WWW site. Moreover, for example, in the case in which contents, which a user intends to refer to, are not recorded, it is possible to view a site delivering the contents in streaming or purchase a recording medium, in which the contents are recorded, such as a DVD through a product sales site.

The information delivering means or the information delivering step may include information for correcting deviation of a clock in a terminal apparatus to be a delivery destination in the reference information and deliver the information. In such a case, even in the case in which time differs in respective terminals that receive related information, it becomes possible to refer to a correct scene.

The information delivering means or the information delivering step may include a characteristic amount of contents at a reference position in the contents in the reference information and deliver the characteristic amount. In such a case, more highly accurate time correction becomes possible and, in addition, in the case in which a scene referred to cannot be found out of recorded contents, it becomes possible to realize a function for searching a scene in contents that are not clearly written in the reference information (e.g., contents rebroadcasted in another station or another time slot) instead and referring to the scene on a terminal apparatus side.

The information delivering means or the information delivering step may deliver plural pieces of reference information collectively. In such a case, it becomes possible to reduce the number of times of communication between a server, which provides content related information, and a terminal apparatus to reduce a load on the server side and improve response of operation in the terminal apparatus.

The information delivering means or the information delivering step can also deliver the related information and/or the reference information in accordance with the HTTP (Hyper Text Transfer Protocol) and cause a user to inspect these pieces of information as a WWW page. In such a case, it becomes possible to use a provision service for content related information in accordance with the invention via a simple interface of an existing WWW. In addition, it becomes possible to perform a delivery service of a pull type for related information and reference information on contents.

The information delivering means or the information delivering step may deliver the related information and/or the reference information in accordance with the SMTP (Simple Mail Transfer Protocol) and deliver these pieces of information to a user as an electronic mail. In such a case, it becomes possible to use a provision service for content related information in accordance with the invention via a simple interface of an electronic mail. In addition, it becomes possible to perform a delivery service of a push type for related information and reference information on contents.

The information delivering means or the information delivering step may designate a character string, which is capable of identifying reference information, in a header of a delivery message at the time of delivery of reference information. In such a case, in a terminal apparatus side having received the reference information, it becomes possible to distinguish a data type via a standard interface of a WWW browser or a mailer to start appropriate processing.

A second aspect of the invention is a bulletin board system that supports information exchange for contents consisting of reference data arranged in time series, characterized by including:

receiving means that, at the time of contribution of a remark concerning contents, receives reference information for specifying a reference position in the contents referred to by the remark together with a remark content;

storing means that stores the remark contents and the reference information in association with each other; and transmitting means that, at the time of inspection of the remark contents, transmits reference information corresponding to the remark contents to a terminal apparatus of a request source.

Note that the "system" referred to in this context means a logical set of plural apparatuses (or functional modules realizing specific functions), and it does not matter whether respective apparatuses or functional modules are in a single housing.

According to the bulletin board system in accordance with the second aspect, it becomes possible to have an argument while referring to contents such as videos and sounds in a bulletin board. In this case, it becomes possible to view the contents being referred to simultaneously with reading respective remarks in the bulletin board by combining the bulletin board system with a dedicated terminal apparatus.

The bulletin board system in accordance with the second aspect may further include: means that specifies an installation region of a terminal apparatus to be a provision destination of information; and means that changes contents of reference information according to the specified installation region. In such a case, it is possible to absorb a difference of a delivery system or a delivery time depending upon a region.

The contents referred to in this context mean, for example, a broadcast program that a broadcasting station broadcasts in accordance with a program schedule. In addition, the reference information includes information specifying a broadcasting station that broadcasts or has broadcasted a program, information specifying a date and time when a reference part in the program is broadcasted or has been broadcasted, and the like. Therefore, the bulletin board system can, in particular, perform information provision that refers to a broadcast program.

The reference information may specify a broadcasting station, which broadcasts or has broadcasted a program, using a channel number. In such as case, on a terminal apparatus side receiving the reference information, it becomes unnecessary to hold complicated information such as a list of broadcasting station names and broadcasting station IDs. In addition, since a mechanism for updating and maintaining such a list becomes unnecessary, design of a terminal apparatus can be performed simply and at low cost.

The transmitting means may transmit a name of a bulletin board, in which a corresponding remark is written, with the name included in the reference information. In such a case, in causing a user to view contents referred to in a terminal apparatus having received the reference information, it becomes easy to simultaneously display a name of a bulletin board in which an original remark is written. It becomes unnecessary to inquire a server about a remark separately.

The transmitting means may transmit a corresponding remark contents with the remark contents included in the reference information. In such a case, in causing a user to view contents referred to in a terminal apparatus having received the reference information, it becomes easy to simultaneously display the contents of the original remark. It becomes unnecessary to inquire a server about a remark separately.

The transmitting means may include identification information of a site handling information resources related to contents in the reference information and deliver the identification information. In such a case, it becomes possible to further inspect information related to contents on a WWW site in the terminal apparatus having received the reference information. Moreover, in the case in which contents, which a user intends to refer to, are not recorded, it becomes possible to view the contents via a site that delivers the contents in streaming or purchase a recording medium such as a DVD having recorded the contents therein through a product sales site.

The transmitting means may include information for correcting deviation of a clock in a terminal apparatus to be a delivery destination in the reference information and deliver the information. In such a case, even in the case in which time differs in respective terminals that receive related information, it becomes possible to refer to a correct scene.

The transmitting means may include a characteristic amount of contents at a reference position in the contents in the reference information and deliver the characteristic amount. In such a case, more highly accurate time correction becomes possible and, in addition, in the case in which a scene referred to cannot be found out of recorded contents, it becomes possible to realize a function for searching a scene in contents that are not clearly written in the reference information (e.g., contents rebroadcasted in another station or another time slot) instead and reproduction to the scene on a terminal apparatus side.

The transmitting means may deliver plural pieces of reference information collectively. In such a case, it becomes possible to reduce the number of times of communication between a server, which provides a bulletin board, and a terminal apparatus to reduce a load on the server side and improve response of operation in the terminal apparatus.

In writing of a remark, the transmitting means may transmit an execution code for automatically acquiring reference information or urging a user to input a remark to a terminal apparatus side of a requiring source or, concerning an execution code for automatically acquiring reference information stored in the terminal apparatus of the requesting source in advance or urging a user to input a remark, the transmitting means may transmit information necessary for starting the execution code to the terminal apparatus. In such a case, it becomes possible to simplify a registration procedure for the reference information at the time when the user writes a remark in a bulletin board and use the bulletin board more easily.

The transmitting means may deliver the remark contents and/or the reference information in accordance with the HTTP (Hyper Text Transfer Protocol). In such a case, it becomes possible to use a bulletin board system in accordance with the invention via a simple interface of a WWW. In addition, it becomes possible to perform delivery of a pull type for a remark and reference information concerning contents.

The transmitting means may deliver the remark contents and/or the reference information in accordance with the SMTP (Simple Mail Transfer Protocol). In such a case, it becomes possible to use the bulletin board system in accordance with the invention via a simple interface of an electronic mail. In addition, it becomes possible to perform delivery of a push type for a remark and reference information concerning contents.

The transmitting means may designate a character string, which is capable of identifying the reference information, in a header of a delivery message at the time of delivery of reference information. In such a case, in a terminal apparatus side having received the reference information, it becomes possible to distinguish a data type via a standard interface of a WWW browser or a mailer to start appropriate processing.

The bulletin board system may further include: means that, concerning a program series to be an object of an argument in a bulletin board, specifies a broadcast schedule for the next broadcast of the series; and means that transmits the broadcast schedule to a terminal apparatus of a request source, and make it possible to perform recording reservation for the program on the basis of information transmitted on the terminal apparatus side. Alternatively, the bulletin board system may further include means that sets a bulletin board for each program series and performs download of the program schedule from a screen displaying information in the bulletin board or a screen displaying a list of remarks in the bulletin board. In such a case, concerning recording reservation, it is possible to simplify a necessary procedure and realize convenience for a user.

The bulletin board system may further include: means that specifies a rebroadcast schedule for a program to be an object of a remark; and means that transmits the rebroadcast schedule to a terminal apparatus of a request source. In addition, the transmitting means may transmit the rebroadcast schedule with the rebroadcast schedule included in reference information. In such a case, in the case in which a program referred to is not recorded, it becomes possible to perform processing for, if rebroadcast of the program is recorded, resending a pertinent scene of the program or, if a date and time of rebroadcast is in future, performing recording reservation for the program in a terminal apparatus easily.

The bulletin board system in accordance with the second aspect of the invention may further include: means that designates retrieval conditions for a remark; and means that retrieves a remark across plural bulletin boards on the basis of the designated retrieval conditions. Further, the bulletin board system may use a keyword included in a remark or designated separately at the time of writing the remark, a name or an ID of a user who has written the remark, a date and time when the remark is written, and the like as retrieval conditions. In such a case, it becomes possible to retrieve a remark across plural bulletin boards and refer to only a remark in which a user is interested, a program to which the remark refers to, or a specific scene in the program.

A third aspect of the invention is a computer program written in a computer readable format so as to execute processing for providing related information on contents consisting of reference data arranged in time series on a computer system, characterized by including:

a related information storing step of storing related information for contents;

a reference information storing step of storing contents referred to by the related information and reference information specifying a data reference position in the contents; and an information delivery step of delivering the related information and/or the reference information.

The computer program in accordance with the third aspect of the invention defines a computer program that is written in a computer readable format so as to realize predetermined processing on a computer system. In other words, a cooperative action is shown on a computer system by installing the computer program in accordance with the third aspect of the invention in the computer system, and it is possible to obtain the same actions and effects as the contents related information provision apparatus and the contents related information provision method in accordance with the first aspect of the invention.

Other objects, characteristics, and advantages of the invention will be apparent through a detailed explanation based on an embodiment of the invention to be described later and attached drawings.

BRIEF DESCRIPTION OF THE DRAWINGS

FIG. 3 is a diagram showing an example of a structure of a screen presented to a user by a bulletin board/remark presenting unit 101.

FIG. 4 is a diagram showing an example of a structure of a screen presented by a user with a remark retrieving unit 102.

FIG. 7 is a diagram showing an example of a structure of reference information encoded by the reference information encoding unit 103.

FIG. 9 is a diagram showing an example of a structure of a screen for remark writing presented by a user with a remark writing processing unit 105.

FIG. 12 is a diagram showing an example of a plug-in execution module for causing a user to input reference information.

FIG. 13 is a diagram showing an example of a structure of a remark/program information database with a table structure simplified.

BEST MODE FOR CARRYING OUT THE INVENTION

An embodiment of the invention will be hereinafter explained in detail with reference to the drawings.

First, an embodiment in the case in which the invention is applied to a bulletin board system will be explained.

In this embodiment, each bulletin board is set for the purpose of an argument and information exchange concerning a specific television program. In writing a remark in the bulletin board, a user can register information for specifying a program/scene referred to by the remark (hereinafter also referred to as "reference information" of a television program) together with remark contents.

Here, the reference information consists of a channel number (broadcasting station) at the time when a program is broadcasted and time when a reference part is broadcasted. The reference information is shaped into a predetermined format when the user inspects the remark contents and then transmitted to a terminal apparatus of the user.

By preparing a mechanism for delivering such reference information, in the terminal apparatus, it becomes possible to start reproduction of a pertinent program/scene from contents recorded in the terminal apparatus on the basis of the received reference information. However, the invention relates to a system on a server side, and an explanation about details of a terminal apparatus side will be omitted.

Note that, in general, a station, a channel, and a time slot in which a certain program is broadcasted vary depending upon a region. In this embodiment, the bulletin board system also includes a mechanism for specifying a region where a user lives (i.e., a terminal apparatus is set) and converting contents of reference information appropriately according to the region (to be described later).

In the bulletin board system in accordance with this embodiment, concerning each program to be an object of an argument in a bulletin board, it is a premise that the program is already recorded on a terminal apparatus on each user side. Thus, in order to make a recording reservation operation semi-automatic and reduce labor and time of a user, it is assumed that the bulletin board system also includes a function for shaping a broadcast schedule of a program into a predetermined format and transmitting the broadcast schedule to the terminal apparatus side.

Figure 1:
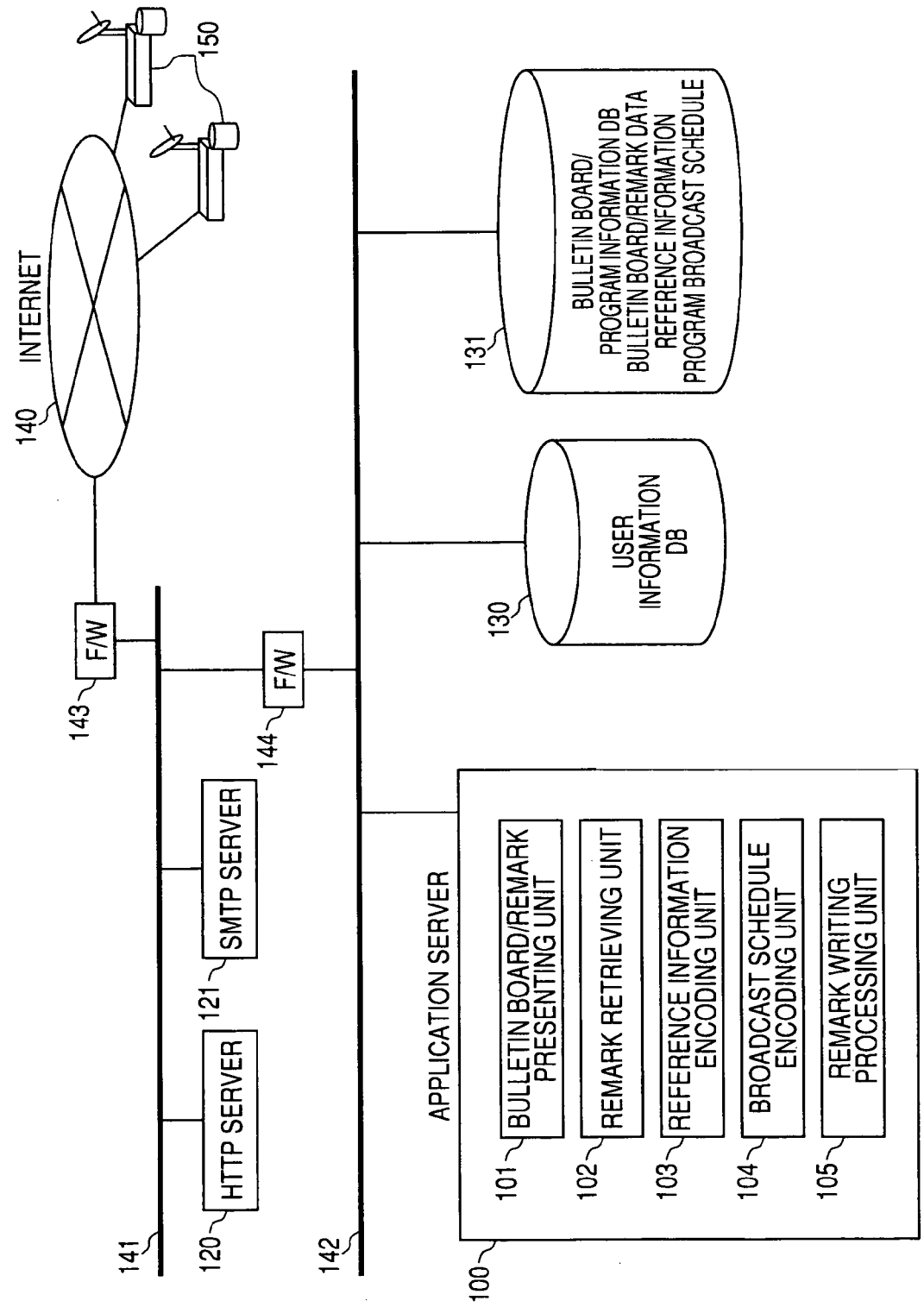
FIG. 1 is a diagram schematically showing a structure of a bulletin board system in accordance with a first embodiment of the invention.

FIG. 1 schematically shows a structure of the bulletin board system in accordance with this embodiment. This bulletin board system includes components to be described below.

Reference numeral 100 denotes an application server, which executes respective pieces of processing for realizing a bulletin board function in accordance with a request from an HTTP (Hyper Text Transfer Protocol) server 120 or an SMTP (Simple Mail Transfer Protocol) server 121.

As show in the figure, the application server 100 includes a bulletin board/remark presenting unit 101, a remark retrieving unit 102, a reference information encoding unit 103, a broadcast schedule encoding unit 104, and a remark writing processing unit 105. The respective pieces of processing are performed by these units.

The bulletin board/remark presenting unit 101 performs processing for shaping contents of information and a remark in a bulletin board into a text or HTML (Hyper Text Markup Language) format and presenting the contents to a user.

The remark retrieving unit 102 performs processing for retrieving a remark matching specific conditions from a bulletin board/program information database 131.

The reference information encoding unit 103 performs processing for specifying reference information corresponding to each remark, converting contents of the remark appropriately according to a terminal installation region, and shaping the contents into a predetermined format.

The broadcast schedule encoding unit 104 specifies a next broadcast schedule for a program being an object of each bulletin board and shaping information on the program into a predetermined format.

The remark writing processing unit 105 performs processing for presenting a form screen for writing a remark in a bulletin board to a user and transmitting a script code for supporting an input operation for reference information to a terminal apparatus on a user side. In addition, the remark writing processing unit 105 performs processing for registering remark contents and reference information, which are inputted by the user via the presented form screen, in the bulletin board/program information database 131.

Reference numeral 120 denotes an HTTP server for providing HTTP contents on a network, receiving an HTTP request from each terminal apparatus, handing over processing to the application server 100, and returning a processing result.

Reference numeral 121 denotes an SMTP server for receiving a processing request in a form of an electronic mail, handing over processing to the application server 100, and delivering a processing result as an electronic mail.

A user information database 130 is a database for recording information such as an account name, a password, a type of an owned terminal, an installation region of a terminal, and a handle name in a bulletin board for each user.

The program/bulletin board information database 131 is a database for recording information such as bulletin board/remark data, reference information, and a program broadcast schedule in association with each other.

Such a bulletin board system is established on a network. The network referred to in this context consists of a wide area network 140 such as the Internet connecting a terminal apparatus of a user and the bulletin board system, internal networks 141 and 142, and the like. Innumerable terminal apparatuses 150 used by users of the system are connected to the Internet 140.

Apparatuses, which are directly accessed from the Internet side, such as the HTTP server 120 and the SMTP server 121 are connected to the internal network 141. In addition, apparatuses, which are not required to be directly accessed from the Internet side, such as the application server 100, the user information database 120, and the bulletin board/program information database 121 are connected to the other internal network 142.

Rooter and firewall apparatuses (F/Ws) 143 and 144 mediate and control communication between the Internet 140 and the respective internal networks 141 and 142.

Figure 2:
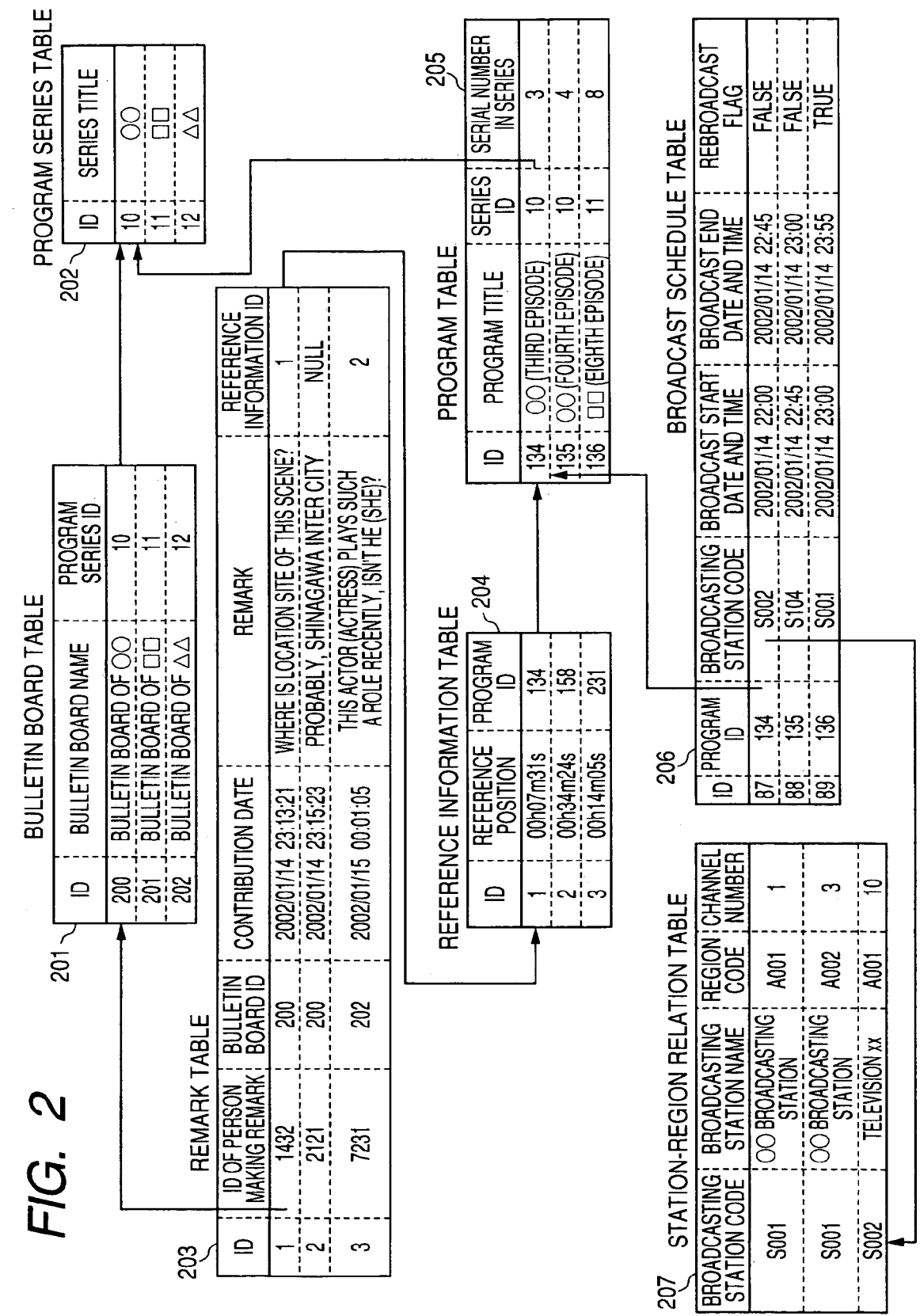
FIG. 2 is a diagram schematically showing information, which is recorded in a bulletin board/program information database 131, in detail.

FIG. 2 shows information recorded in the bulletin board/program information database 131 in detail.

In a bulletin board table 201, names of respective bulletin boards and program series to be objects of the respective bulletin boards are recorded.

In a program series table 202, IDs of the program series are defined and, at the same time, titles of the program series are recorded.

In a remark table 203, contents, persons making remarks, dates of contribution, and IDs of corresponding reference information of remarks written in the respective bulletin boards are recorded.

In a reference information table 204, IDs and reference parts (relative time from tops of the programs) of programs to be referred to for the respective pieces of reference information are recorded.

In a program table 205, titles of respective programs, IDs of program series to which the programs belong, and sequence numbers in program series, in which the programs are broadcasted, are recorded.

In a broadcast schedule table 206, for respective programs, broadcasting stations and broadcast start/end dates and times at the time when the programs are broadcasted are recorded. In general, since the respective programs are broadcasted in plural stations/time slots, plural records are recorded for one program in this table.

In a station-region relation table 207, correspondence relations among broadcasting station codes, broadcasting station names, regions, channel numbers are recorded.

FIG. 3 shows an example of a structure of a screen presented to a user by the bulletin board/remark presenting unit 101. Processing of the bulletin board/remark presenting unit 101 is the same as processing in the case of a normal bulletin board system but is different from a normal bulletin board in that buttons or links as described below are presented in addition to a list of remarks.

Reference numeral 301 denotes a button (link) for downloading reference information. By clicking this button, reference information shaped into a predetermined format via the reference information encoding unit 103 is downloaded.

Reference numeral 302 denotes a button (link) for calling a screen for writing a remark in a bulletin board. By clicking this button, a form screen for writing a remark via the remark writing processing unit 105 is presented to a user.

Reference numeral 303 denotes a button (link) for downloading a next broadcast schedule for recording reservation. By clicking this button, a broadcast schedule shaped into a predetermined format via the broadcast schedule encoding unit 104 is downloaded.

Figure 5:
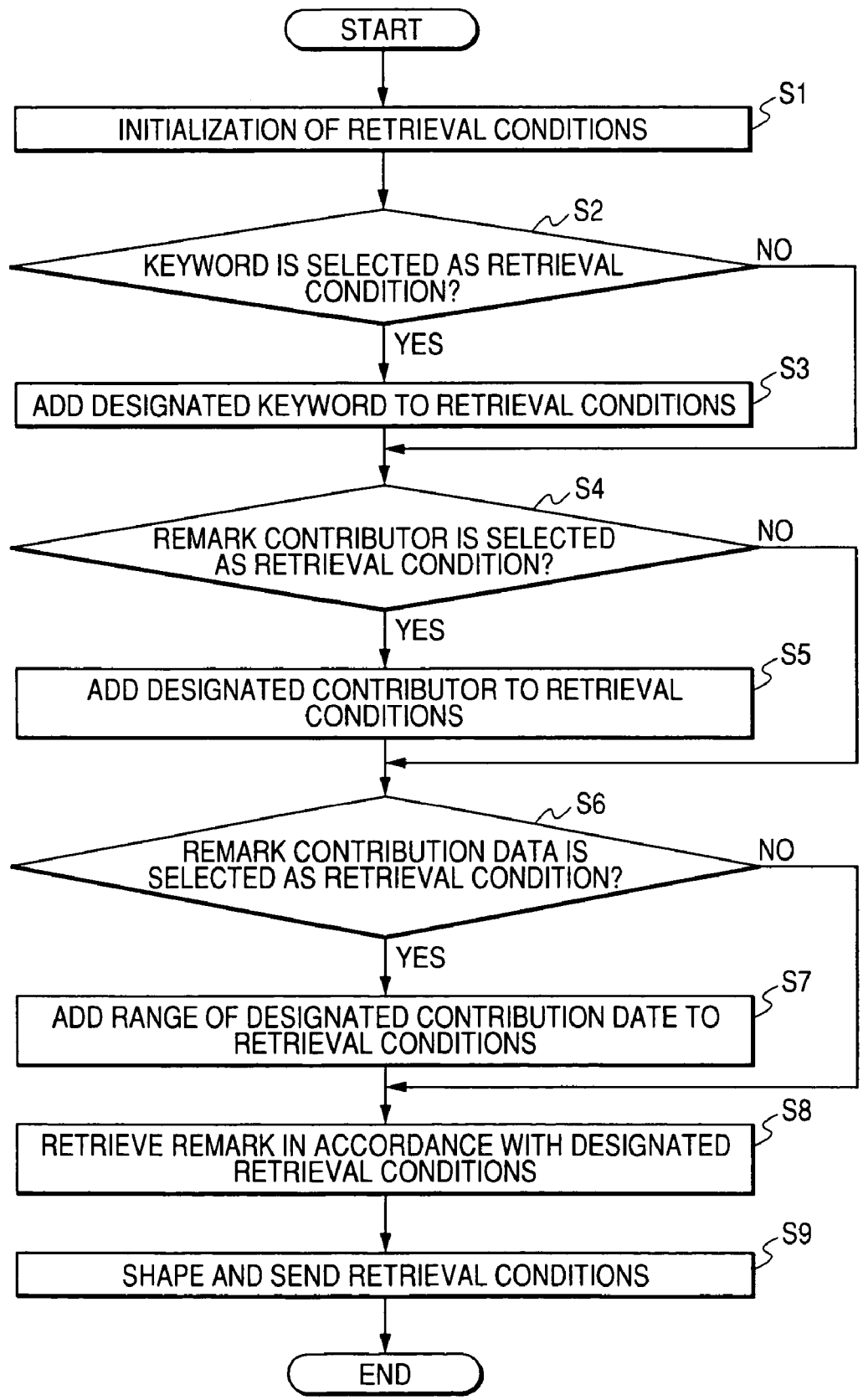
FIG. 5 is a flowchart showing a procedure for performing retrieval processing for a remark in the remark retrieval unit 102.

FIG. 4 shows an example of a structure of a screen presented to a user by the remark retrieving unit 102. In addition, FIG. 5 shows a procedure for performing retrieval processing for a remark in the remark retrieving unit 102 in a form of a flowchart.

First, the remark retrieving unit 102 performs initialization of remark retrieval conditions (step S1). Then, the remark retrieving unit 102 checks whether retrieval by a keyword is selected in a check box 401 on a screen shown in FIG. 4 (step S2). If the retrieval by a keyword is selected, the remark retrieving unit 102 shifts to the next step S3. If the retrieval by a keyword is not selected, the remark retrieving unit 102 shifts to step S4 after the next.

In step S3, concerning a keyword designated in a keyword input field 402, the remark retrieving unit 102 adds a condition to the effect that "retrieve all remarks including the keyword in a text" to the retrieval conditions. Note that, although a keyword is retrieved out of remark contents here, it is also possible that the remark retrieving unit 102 causes a user to input a keyword separately from the remark contents at the time of contribution of a remark and performs retrieval processing using the keyword.

In step S4, the remark retrieving unit 102 checks whether retrieval by a person making a remark is selected in a check box 403. If the retrieval by a person making a remark is selected, the remark retrieving unit 102 shifts to the next step S5. If the retrieval by a person making a remark is not selected, the remark retrieving unit 102 sifts to step S6 after the next.

In step S5, concerning a person making a remark designated in a remarking input field 404, the remark retrieving unit 102 adds a condition to the effect that "retrieve all remarks written by the person" to the retrieval conditions.

In step S6, the remark retrieving unit 102 checks whether retrieval by a remark contribution date is selected in a check box 405. Then, if the retrieval by a remark contribution date is selected, the remark retrieving unit 102 shifts to the next step S7. If the retrieval by a remark contribution date is not selected, the remark retrieving unit 102 shifts to step S8 after the next.

In step S7, the remark retrieving unit 102 adds a retrieval condition concerning a range of a remark contribution data designated in a contribution date input space 406.

In step S8, the remark retrieving unit 102 performs retrieval of a pertinent remark from the bulletin board/program information database 131 in accordance with the retrieval conditions set by the respective steps described above.

Then, concerning the remark retrieved from the database 131, the remark retrieving unit 102 shapes the remark into an HTML format or an email format so as to obtain a screen structure shown in FIG. 3 and transmits the remark to the user (step S9). On a terminal apparatus of the user to be a request source, it is possible to inspect a retrieval result concerning a desired remark on a standard browser or an email screen.

Figure 6:
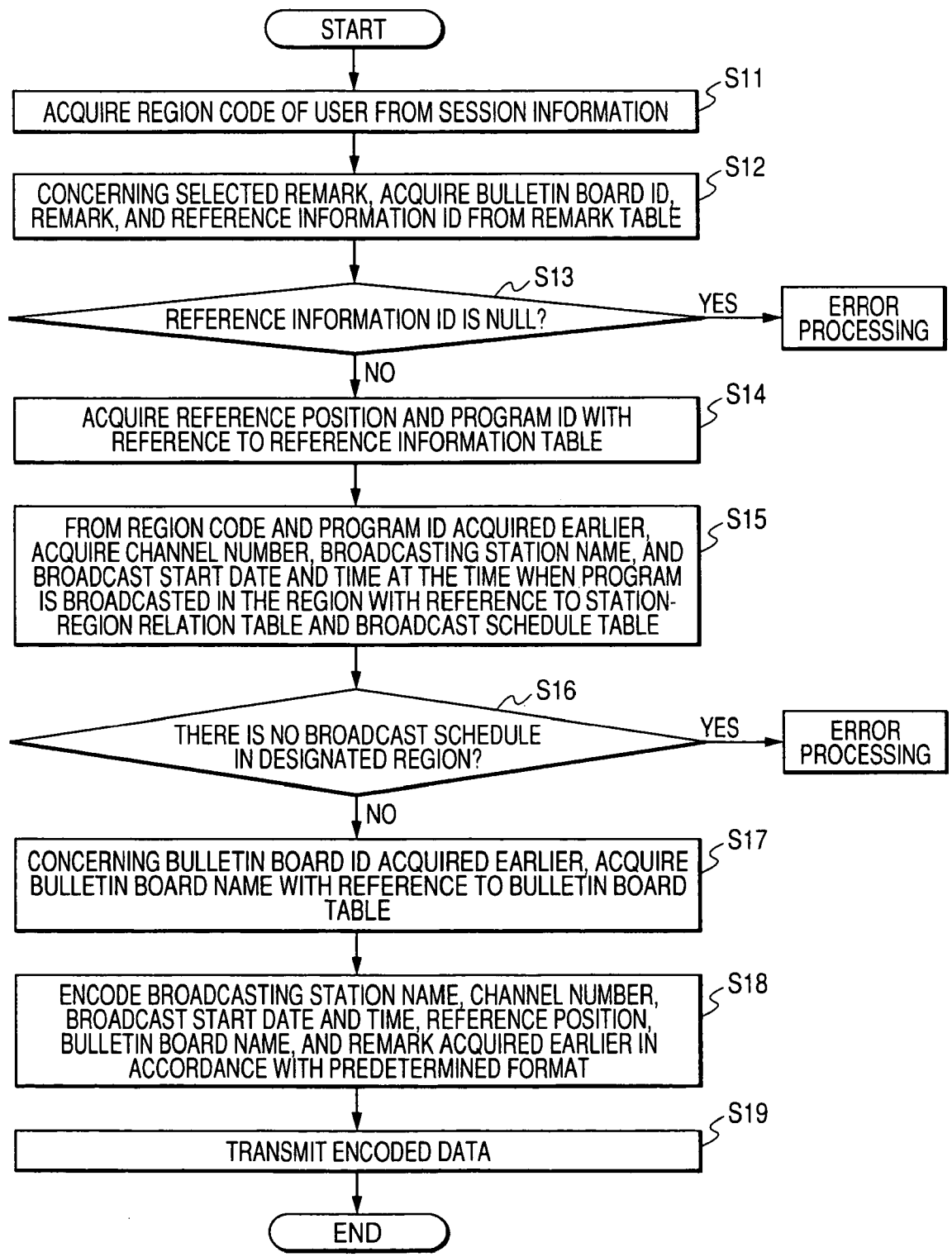
FIG. 6 is a flowchart showing a processing operation executed in a reference information encoding unit 103.

FIG. 6 shows a processing operation to be executed in the reference information encoding unit 103 in a form of a flow chart. Note that it is assumed that log-in processing for a user is performed prior to this processing, and user information such as a terminal installation region is read from the user information database 130 and stored in session information. In addition, a remark to be a processing object is selected on the screen in FIG. 3.

First, the reference information encoding unit 103 reads out a region code of a region where a terminal apparatus of the user is installed from the session information (step S11)

Subsequently, concerning the selected remark, the reference information encoding unit 103 acquires a bulletin board ID, a remark, and a reference information ID from the remark table 203 (step S12).

Subsequently, the reference information encoding unit 103 judges whether the reference information ID acquired in step S12 is NULL (step S13) and, if the reference information ID is NULL, performs error processing.

Subsequently, the reference information encoding unit 103 acquires a reference position and a program ID with reference to the reference information table 204 on the basis of the reference information ID acquired earlier (step S14).

Subsequently, the reference information encoding unit 103 acquires a channel number, a broadcasting station name, and a broadcast start date and time at the time when a program is broadcasted in the region from the region code and the program ID acquired earlier with reference to the station-region relation table 207 and the broadcast schedule table 206 (step S15).

Subsequently, the reference information encoding unit 103 judges presence or absence of a broadcast schedule in the designated region on the basis of a result of processing in step S15 (step S16). If a pertinent broadcast schedule is not present, the reference information encoding unit 103 performs error processing.

Subsequently, concerning the bulletin board ID acquired earlier, the reference information encoding unit 103 acquires a bulletin board name with reference to the bulletin board table 201 (step S17).

Then, the reference information encoding unit 103 applies encoding to the broadcasting station name, the channel number, the broadcast start date and time, the reference position, the bulletin board name, and the remark, which are acquired in the processing described above, in accordance with a predetermined format (step S18).

Finally, the reference information encoding unit 103 transmits data encoded in step S18 to the terminal apparatus of the request source (step S19). In this case, the reference information encoding unit 103 designates a predetermined character string (e.g., "application/x-tzvine-jump") as a content type in a header portion of a response in the HTTP protocol. Consequently, on the terminal apparatus side having received the data, it is judged that the received data is data obtained by encoding reference information, and it is possible to start processing such as retrieval and reproduction start of a pertinent program and a specific scene in the program.

FIG. 7 shows an example of a structure of reference information encoded by the reference information encoding unit 103.

A first row of the reference information includes a character string for distinguishing a data type/format. In addition, a version of a format is written in a second row.

A station name of a broadcasting station, which broadcasted a program to be referred to, is written in a third row. A channel number at the time when the program to be referred to was broadcasted in a region where a terminal apparatus of a user was installed is written in a fourth row. In addition, a date and time when the program to be referred to was broadcasted is written in fifth to seventh rows.

A reference time in writing a broadcast time of a scene to be referred to is written in an eighth row. In the example shown in FIG. 7, a start time of the program is used as the reference time. In addition, a broadcast time of the scene to be referred to is represented as a relative time from the reference time in a ninth row.

A name of a bulletin board, in which a remark associated with this reference information is written, is written in a tenth row. This information is unnecessary if the pertinent scene is retrieved and reproduced in the terminal apparatus of the user. However, in the case in which it is intended to simultaneously display a bulletin board name at the time of reproduction of the scene, it becomes unnecessary to make connection to a server again by including this information in the reference information and encoding the information.

The number of rows of remark contents in a thirteenth row and subsequent rows is written in an eleventh row. A twelfth row is a blank row for separating the header part described above and remark contents after that.

Contents of a remark associated with this reference information are written in the thirteenth row. Although this information is unnecessary if the scene is retrieved and reproduced in the terminal apparatus, in the case in which it is intended to simultaneously display the remark contents at the time of reproduction of the scene, it becomes unnecessary to make connection to the server again by including this information in the reference information and encoding the information.

In addition to the contents of the reference information shown in FIG. 7, a URL (Uniform Resource Locator) of a related WWW site (e.g., a web page of a contributor, an official page of a program to be referred to or a broadcasting station of the program, a site performing streaming delivery of a pertinent program, or a site performing product sales for a DVD or the like) may also be encoded.

In the case in which the related WWW site is a web page of a contributor, a URL of a web page of each user is registered in a user information database together with other information or a contributor is caused to designate a URL at the time of writing of a remark, and a field is added to the remark table 203 or the reference information table 204 to record the URL. On the other hand, in the case in which the related WWW site is an official page or the like of each program, a field is added in the program table 205 or the program series table 202 to record a URL for each program/program series.

Moreover, in addition to the contents of the reference information shown in FIG. 7, information for correcting deviation of a clock in a terminal apparatus may also be encoded. For example, when the reference information is registered, a width of deviation of time in the terminal apparatus and a server at that point is recorded to include this value in the reference information. In this way, it becomes possible to perform processing for shifting a position to be reproduced by the designated width of deviation in another terminal apparatus that has received the reference information. Alternatively, characteristic amounts of video/sound data of a pertinent scene (an average of pixel values, color distribution, intensity of specific frequency components, etc.) may be included in encoded reference information. In this case, the characteristic amount of the scene are calculated on a terminal apparatus side at the time of writing of a remark and then uploaded to a server side together with other information. The uploaded characteristic amounts are recorded by adding a field in the reference information table (204). In this way, even in the case in which a clock on the terminal apparatus side deviates, it is possible to correct the deviation by comparing the characteristic amounts and characteristic amounts of scenes before and after a time designated in the reference information and start reproduction from a correct position. In addition, in the case in which a program designated in the reference information is not recorded on the terminal apparatus side, it is possible to implement a function of retrieving the program rebroadcasted in another station/time slot and reproducing the program instead on the terminal side by comparing the designated characteristic amounts and characteristic amounts calculated for each recorded program/scene.

Moreover, in addition to the contents of the reference information shown in FIG. 7, a broadcast schedule in the case in which a program to be referred to is rebroadcasted may also be encoded. In this way, processing as described below can be performed in the case in which the program is not recorded in a terminal apparatus.

(1) Instead of a designated program, retrieve and reproduce a pertinent scene in the program broadcasted in that case.

(2) In the case in which a designated rebroadcast schedule is a date and time in future, perform recording reservation for the rebroadcast schedule.

In addition, in the case in which a rebroadcast schedule is included in reference information, in the processing of step S15 of the flowchart shown in FIG. 6, a record, for which a rebroadcast flag of the broadcast schedule table 206 is TRUE, is retrieved simultaneously. Note that, rather than including a broadcast schedule for rebroadcast in the reference information, it is possible to perform the following.

(1) Download reference information for rebroadcast separately.

(2) As in the broadcast schedule encoding unit 104, the reference information is downloaded separately in a predetermined format such as iEPG (Internet Electric Program Guide).

In the embodiment of the invention described above, the reference information for each remark is encoded and transmitted piece by piece. However, reference information for all remarks in a bulletin board may be encoded and transmitted collectively. For example, concerning the text data shown in FIG. 7, plural data are arranged to be one data in an MIME (Multipurpose Internet Mail Extension) multipart format. In this way, it is possible to reduce the number of times of communication between a server and a terminal apparatus and improve response to a load on a server side and an operation on a terminal apparatus side.

Figure 8:
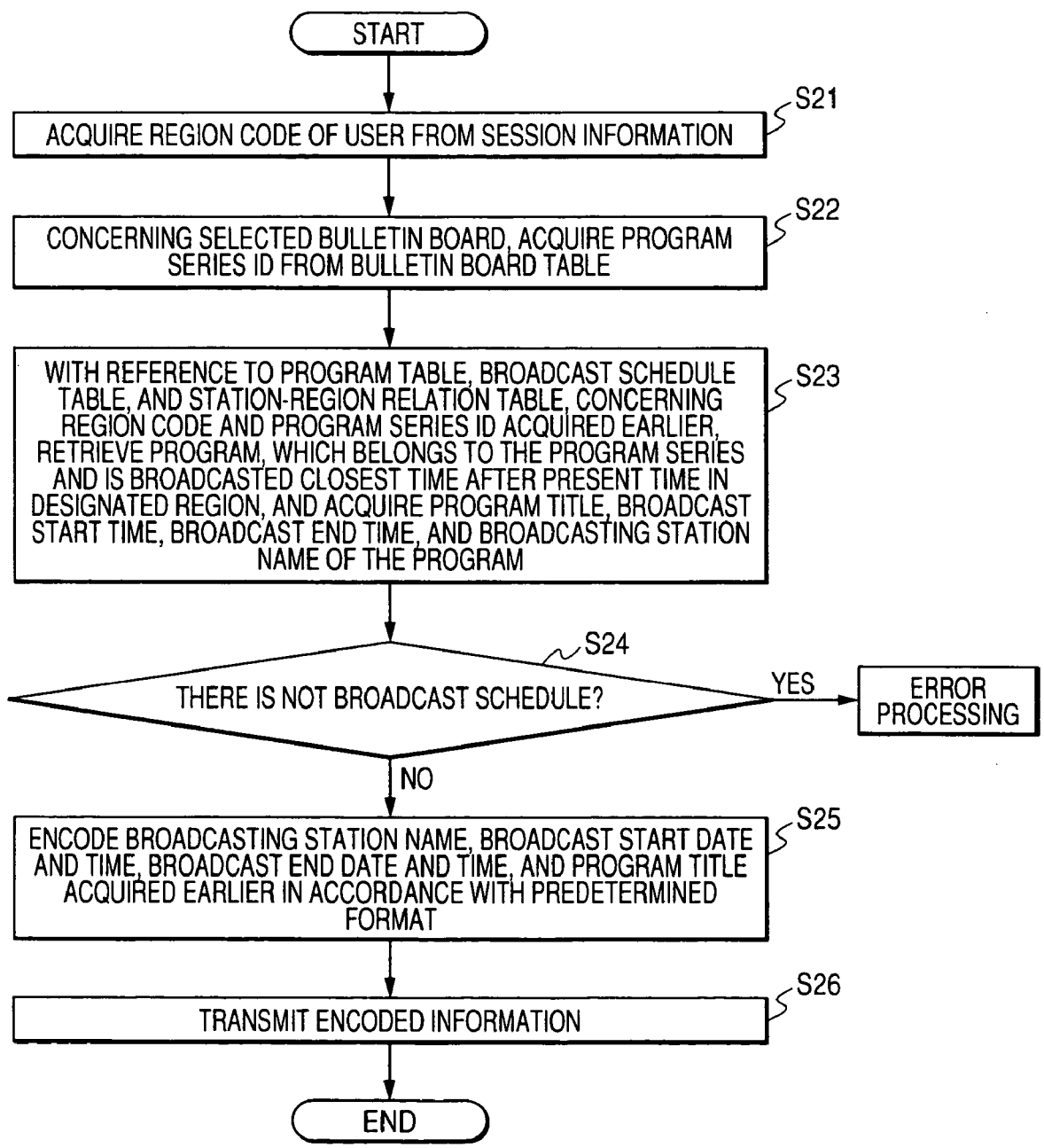
FIG. 8 is a flowchart showing a procedure of a processing operation in a broadcast schedule encoding unit 104.

FIG. 8 shows a procedure of a processing operation in the broadcast schedule encoding unit 104 in a form of a flowchart. Note that it is assumed that log-in processing for a user is performed prior to this processing, and user information such as a terminal installation region is read from the user information database 130 and stored in session information. In addition, a bulletin board to be a processing object is selected on the screen shown in FIG. 3.

First, the broadcast schedule encoding unit 104 acquires a region code of a user from the session information (step S21). Then, concerning the selected bulletin board, the broadcast schedule encoding unit 104 acquires a program series ID from the bulletin board table 201 (step S22).

Subsequently, with reference to the program table 205, the broadcast schedule table 206, and the station-region relation table 207, concerning the region code and a program series ID acquired earlier, the broadcast schedule encoding unit 104 retrieves a program, which belongs to the program series and is broadcasted at closest time after the present time in the designated region, and acquires a program title, a broadcast start time, a broadcast end time, and a broadcasting station name of the program (step S23).

Subsequently, the broadcast schedule encoding unit 104 judges whether an appropriate broadcast schedule is found as a result of the retrieval in step S23 (step S24). If an appropriate broadcast schedule is not found, the broadcast schedule encoding unit 104 performs error processing.

Subsequently, the broadcast schedule encoding unit 104 encodes the program title, the broadcast start time, the broadcast end time, and the broadcasting station name acquired earlier into a predetermined format (e.g., iEPG format) (step S25).

Then, the broadcast schedule encoding unit 104 transmits data encoded in step S25 to a terminal apparatus of a user of a request source (step S26) and ends an entire routine of the processing.

FIG. 9 shows an example of a structure of a screen for remark writing that is presented to a user by the remark writing processing unit 105. The user can perform the following operations via a screen shown in the figure.

(1) Write contents of a remark to be contributed in a text input field 901.
(2) Select whether reference information is to be also registered for the remark to be contributed using a check box 902.
(3) Select a broadcast data of a program to be a reference destination using a pull-down list 903.
(4) Input a position of a scene to be referred to as a relative time from a top of the program using a numerical value writing field 904.

Figure 10:
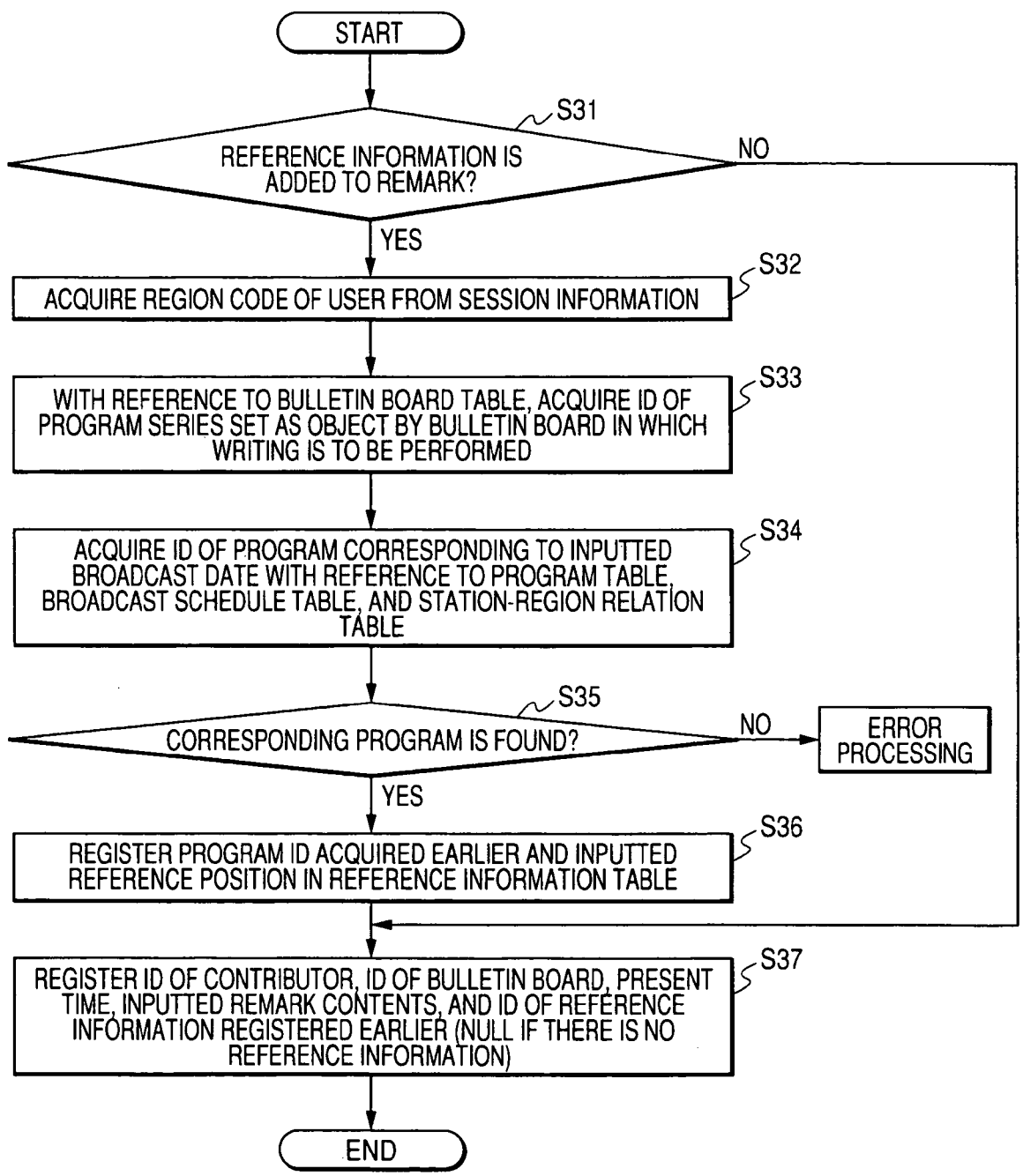
FIG. 10 is a flowchart showing a processing operation in the remark writing processing unit 105.

FIG. 10 shows a processing operation in the remark writing processing unit 105 in a form of a flowchart.

First, the remark writing processing unit 105 judges whether reference information is added to a remark to be written, that is, whether it is selected to also register reference information in the check box 902 on the screen shown in FIG. 9 (step S31). If the reference information is added, the remark writing processing unit 105 shifts to the next step S32, and if the reference information is not added, the remark writing processing unit 105 shifts to processing of step S37.

In step S32, the remark writing processing unit 105 acquires a region code of a region where a terminal apparatus of a user is installed from session information.

Subsequently, with reference to the bulletin board table 201, the remark writing processing unit 105 acquires an ID of a program series set as an object in a bulletin board that is a writing destination (step S33).

Subsequently, with reference to the program table 205, the broadcast schedule table 206, and the station-region relation tale 207, the remark writing processing unit 105 specifies a broadcast installment of a program on the basis of a region code and a program series ID acquired earlier and a broadcast date designated in the pull-down menu 903 on the screen shown in FIG. 9 and acquires an ID of a corresponding record in the program table 205 (step S34).

In step S35, the remark writing processing unit 105 judges whether an appropriate program has been found in step S34. If an appropriate program has not been found, the remark writing processing unit 105 performs error processing.

Subsequently, the remark writing processing unit 105 registers a reference position, which is inputted in the input field 904 on the screen shown in FIG. 9, and the program ID, which is acquired in step S34, in the reference information table 204 (step S36).

Then, the remark writing processing unit 105 registers an ID of a contributor, an ID of a bulletin board in which a remark is to be written, a present time (contribution date), contents of a remark written in the text input field 901 on the screen shown in FIG. 9, and the ID of a record registered in the reference information table 204 in step S36 (NULL when the processing is shifted from step S31) in the remark table 203 (step S37).

As described above, in contributing a remark, a user inputs reference information via the screen shown in FIG. 9. However, it is complicated to manually input a broadcast date and a position of a scene of a program to be referred to. Thus, in this embodiment, a script code, which a terminal apparatus can interpret and execute, is transmitted together with the screen shown in FIG. 9 to perform automatic input of a form.

Figure 11:
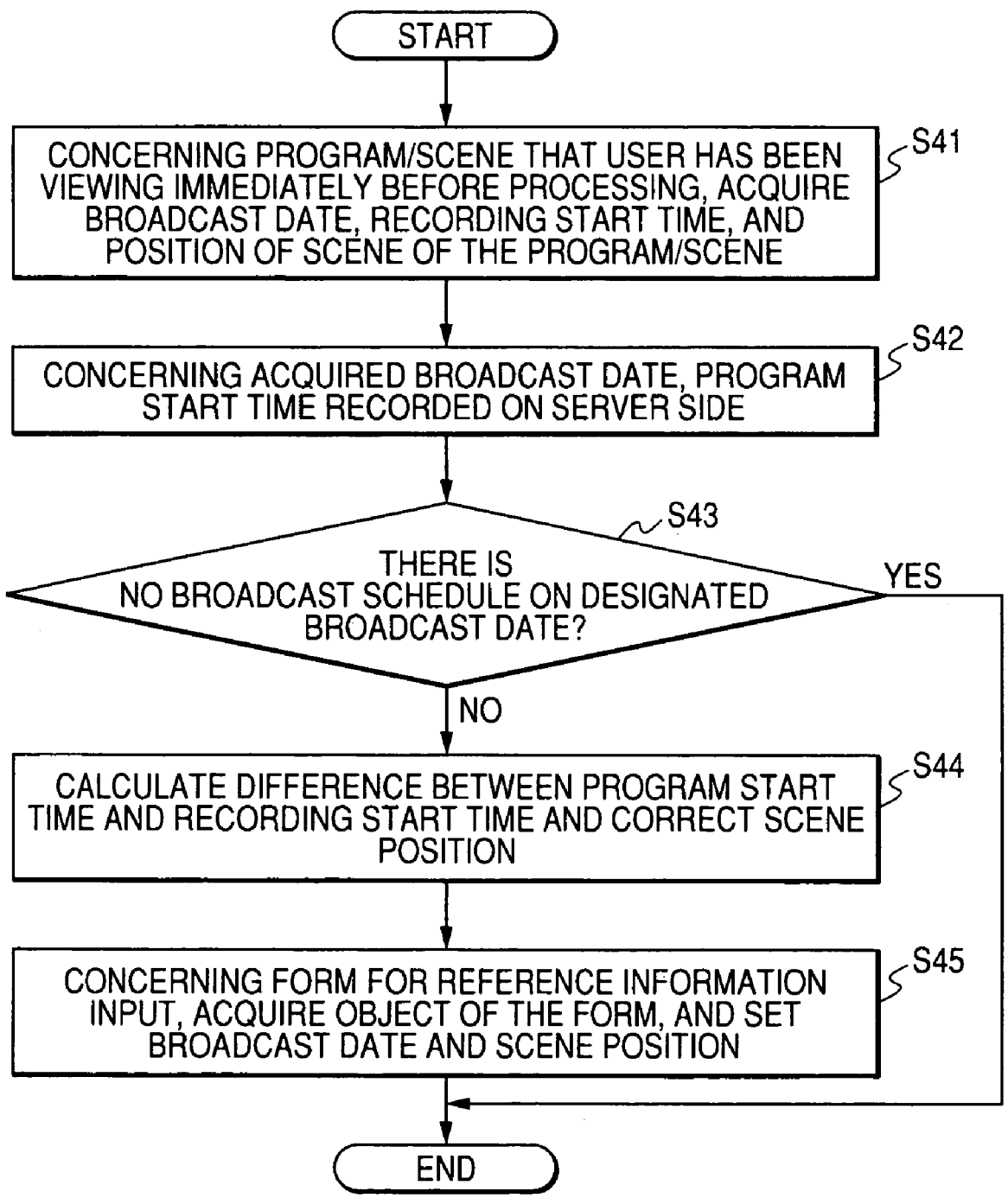
FIG. 11 is a flowchart showing a processing operation for realizing processing for contribution of a remark by a user with a script code.

FIG. 11 shows a processing operation to be realized by this script code in a form of a flowchart. It should be noted that this processing is performed on a terminal apparatus side rather than on a server side. In this processing, concerning a program/scene that a user has been viewing immediately before the processing using a terminal apparatus, a broadcast date of the program and a position of the scene are set in the respective input fields 903 and 904 on a screen.

First, concerning the program/scene that the user has been viewing immediately before the processing with the terminal apparatus, the terminal apparatus acquires a broadcast date, a recording start time, and a position of the scene (relative position from a top of the program) (step S41). Note that acquisition of data is realized by calling a built-in function prepared on the terminal apparatus side or referring to a specific file/memory area.

Subsequently, concerning the broadcast date acquired in step S41, the terminal apparatus acquires a program start time recorded on the server side (step S42). A program start time in each broadcast date is read out from the broadcast schedule table 206 in advance on the server side and then embedded in this script code.

Subsequently, in step S42, the terminal apparatus checks whether a program start time in a designated broadcast date could be acquired in step S42 (step S43). Then, if the program start time could not be acquired, that is, if there is no broadcast schedule in the designated date, the terminal apparatus ends execution of the script code and causes the user himself/herself to input data of a form.

Subsequently, the terminal apparatus calculates a difference between the program start time acquired earlier and a recording start time and corrects a scene position by the difference (step S44). Consequently, even in the case in which recording is not started from a top of a program on the terminal apparatus side, it becomes possible to input a correct value without causing deviation of a reference position.

Subsequently, the terminal apparatus acquires form objects corresponding to the forms for reference information input 902 to 904 and sets a broadcast date in the form 903 and sets a scene position in the form 904 (step S45). In addition, the terminal apparatus sets the check box 902 in a selected state.

Note that, rather than transmitting the script code to the server side to cause the terminal apparatus to execute the script code as described above, an execution module such as a plug-in prepared on the terminal apparatus side in advance may be started to cause the terminal apparatus to input reference information. In this case, for example, a code for calling an execution module as shown in FIG. 12 is included in an HTML source code constituting the screen shown in FIG. 9.

Here, a third row of the code shown in the figure indicates an ID for specifying a plug-in to be started. In addition, fourth to eighth rows indicate parameters to be handed to the execution module. In an example shown in the figure, the rows designate a presenting destination URL and the like at the time when a broadcast schedule of an object program and a remark/reference information are registered.

The embodiment mentioned above is premised that a broadcast schedule of each program is different for each region. However, in the case in which only a program broadcasted at the same time nationwide such as a program in a prime time is set as an object, a table structure in a remark/program information database can be simplified.

FIG. 13 shows an example of a structure of a remark/program information database with a table structure simplified.

In the figure, information on a broadcast time slot and affiliated networks of a broadcasting station is recorded in a program table 1301, and a name/channel number of a broadcasting station in each region for each affiliated network is recorded in a station-region relation table 1302. This makes it unnecessary to manage a broadcast schedule of a program to be an object of a bulletin board for each station and makes it possible to reduce operation cost of a server.

In the case in which it can be assumed that a broadcast time slop of each program is common throughout a program series, information on a broadcast schedule (affiliated network, broadcast start/end date and time) is moved to the program series table 202, whereby further simplification becomes possible.

The broadcast start/end date and time may be recorded in the program table 1301 only for a broadcast installment in which a broadcast schedule and a broadcast time slot of the program series table 202 extended in this way are different.

In addition, in the embodiment described above, the case in which the system is used as a bulletin board on a WWW mainly via the HTTP server 120 is explained. However, remark/reference information/a broadcast schedule and the like may be delivered to a user as an electronic mail via the SMTP server 121. In this case, at a point when the remark/reference information is registered by the remark writing processing unit 105, an electronic mail with remark contents as a text and reference information shaped by the reference information encoding unit 103 as an attached file only has to be delivered to a user registered in advance via the SMTP server 121.

In the embodiment described above, the invention is applied to a bulletin board system. It is possible to apply a technique for transmitting reference information for video/sound contents such as a television program to a terminal apparatus together with information desired to be presented to a user and causing the user to view contents stored on the terminal apparatus side not only to a bulletin board but also to a system in general that performs information provision while referring to video/sound contents.

Figure 14:
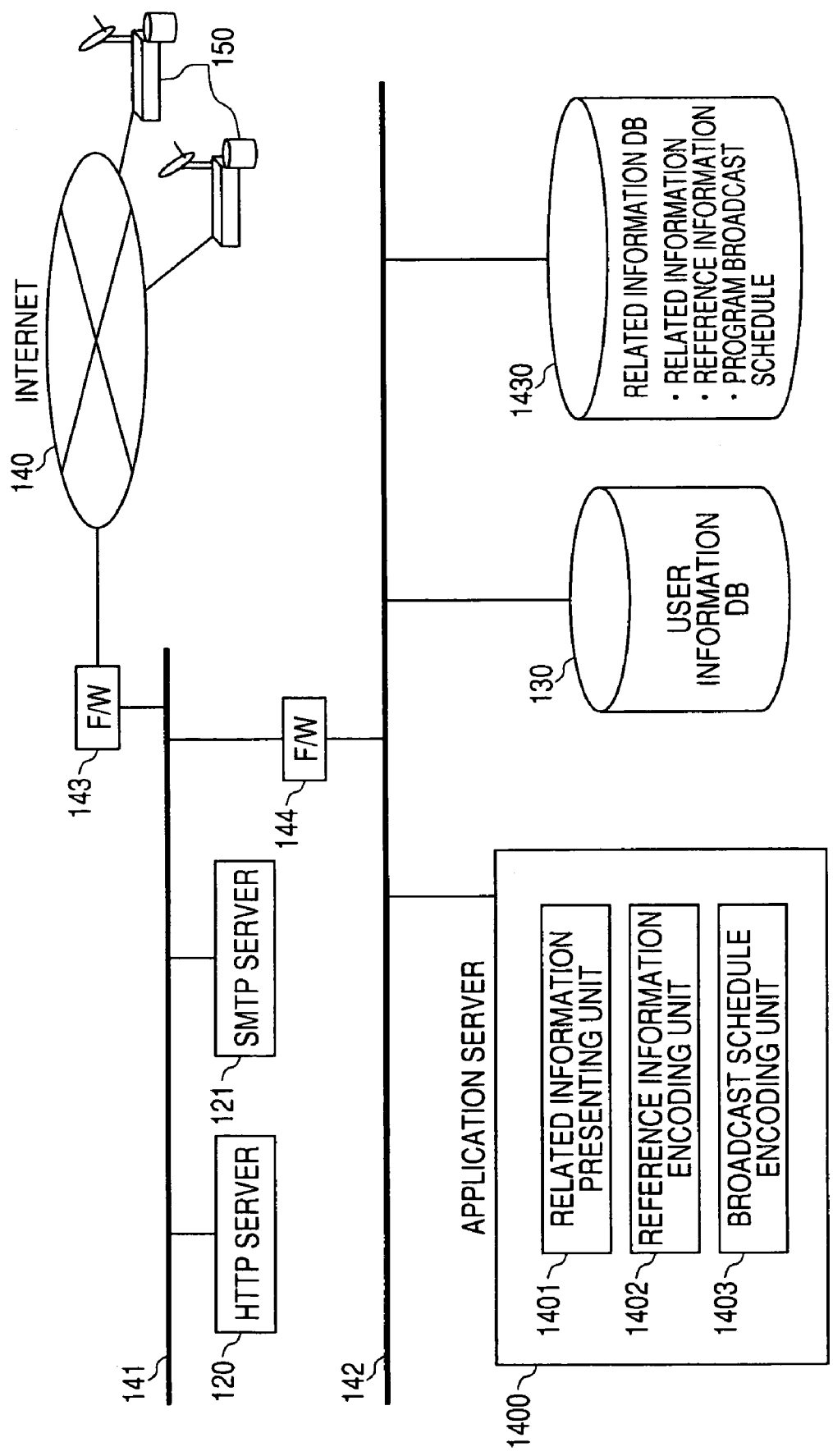
FIG. 14 is a diagram showing an example in which the invention is applied to a system that presents related information on video/sound contents together with reference information.

FIG. 14 shows a system structure in the case in which the invention is applied to such an information provision server. In this system, related information on video/sound contents is presented together with reference information.

Reference numeral 1400 denotes an application server, which executes respective pieces of processing for realizing a function for providing content related information in accordance with a request from the HTTP server 120 or the SMTP server 121.

As shown in the figure, the application server 1400 includes a related information provision unit 1401, a reference information encoding unit 1402, and a broadcast schedule encoding unit 1403.

The related information provision unit 1401 has a role equivalent to the bulletin board/remark presenting unit 101 in the aforementioned bulletin board system and presents related information to be provided to a user together with a button or a link for reference information acquisition. In this case, contents of related information to be provided may be changed for each region on the basis of information on a terminal installation region registered in the user information database 130.

The reference information encoding unit 1402 has a function equivalent to the reference information encoding unit 103 in the aforementioned bulletin board system and performs processing for specifying reference information corresponding to related information to be provided, converting contents of the reference information appropriately according to a terminal installation region, and shaping the reference information into a predetermined format.

The broadcast schedule encoding unit 1403 has a role equivalent to the broadcast schedule encoding unit 104 in the aforementioned bulletin board system and performs processing for specifying a broadcast schedule for a program referred to by related information to be provided and shaping information on the broadcast schedule into a predetermined format.

Note that, rather than encoding a broadcast schedule individually in this way, the broadcast schedule may be encoded together with reference information in the reference information encoding unit 1402. In this case, broadcast start/end time of a program is included in the encoded reference information (information specifying a broadcasting station is already included in the reference information). Consequently, an operation can be switched in such a way that a terminal apparatus having received the encoded reference information makes recording reservation if it is before broadcast or starts reproduction of a recorded program if it is after broadcast. It becomes possible to perform information provision continuously across a broadcast date and time of a program.

Note that, in this specification, for convenience of explanation, it is assumed that related information on video/sound contents is presented to a user. However, actually, information to be provided may be any information. For example, the invention is applied to various kinds of information indicated below, whereby it is possible to perform information provision while referring to video/sound contents such as a television program.

(1) An introduction page for an actor is provided such that reference information concerning programs in which the actor appears (or appeared) can be downloaded from the page as "recent works".

(2) An introduction/sales page for a product is created such that reference information on a program in which the program is featured can be downloaded.

ADDENDUM

The invention has been explained in detail with reference to the specific embodiment. However, it is obvious that those skilled in the art can perform alterations and substitutions of the embodiment within a range not departing from the spirit of the invention. In other words, the invention has been disclosed in a form of illustration, and the contents described in this specification should not be interpreted restrictively. In order to judge the spirit of the invention, the section of the patent claim described in the beginning should be taken into account.

INDUSTRIAL APPLICABILITY

According to the invention, it is possible to provide an excellent content related information provision apparatus and an excellent content related information provision method, an excellent bulletin board system, as well as an excellent computer program that preferably support sharing of information such as comments concerning respective scenes in program contents on the air or recorded program contents among users.

In addition, according to the invention, it is possible to provide an excellent content related information provision apparatus and an excellent content related information provision method, an excellent bulletin board system, as well as an excellent computer program that can preferably support creation of information such as comments concerning respective scenes in program contents and transmission and reception work for this kind of information.

Further, according to the invention, it is possible to provide an excellent content related information provision apparatus and an excellent content related information provision method, an excellent bulletin board system, as well as an excellent computer program that can realize a mechanism in which, while reading a remark in a bulletin board system, a user searches a program or a scene referred to by the remark out of contents stored in a PC or a video recording machine for home use and views the program or the scene or views a program or a scene related to specific WWW contents in the same manner.

According to the invention, it becomes possible to, without holding a copy of contents such as videos and sounds on a server side, perform information provision to a user while referring to a specific part of the contents.

The invention claimed is:

1. A content related information provision apparatus that provides related information on contents including reference data arranged in time series, the apparatus comprising:
   related information receiving means that receives related information on contents from one or more user devices, the related information including an identification of the contents, user remarks to the contents, and a reference time position of the user remarks relating to the contents;
   related information storing means that stores the received related information;
   reference information receiving means that receives reference information from the one or more user devices, the reference information including a keyword specifying contents to be referred to by the user remarks to the contents, and specifying a time reference position in the contents;
   reference information storing means that stores the received reference information;
   information delivering means that searches the related information storing means for matching related information that matches at least one of the keyword or the time reference position of the reference information from the reference information receiving means, and transmits the matching related information for displaying on a display at a specific user device from among said one or more user devices, and that delivers at least one of the matching related information or the stored reference information to the one or more user devices;
   means that specifies an installation region of a terminal apparatus of the one or more user devices to be a delivery destination according to the information delivering means, the installation region indicating a geographic region where the terminal apparatus of the one or more user devices is installed; and
   information changing means that changes contents of related information and/or reference information, which should be delivered, according to the installation region, wherein the content referred to in the matching related information was already distributed or will be distributed to the one or more user devices.

2. A content related information provision apparatus according to claim 1, wherein
   the contents refer to a broadcast program, and
   the reference information includes information specifying a broadcasting station, which broadcasts or has broadcasted a program, and information specifying a date and time when a reference part in a program is broadcasted or has been broadcasted.

3. A content related information provision apparatus according to claim 2, wherein the reference information specifies a broadcasting station, which broadcasts or has broadcasted a program, using a channel number.

4. A content related information provision apparatus according to claim 2, wherein the reference information further includes information for specifying a broadcast starting date and time of the program and information for specifying a broadcast end time of a program or a length of the program.

5. A content related information provision apparatus according to claim 1, wherein the information delivering means includes identification information of a site handling information resources related to contents in the reference information and delivers the identification information.

6. A content related information provision apparatus according to claim 1, wherein the information delivering means includes information for correcting deviation of a clock in a terminal apparatus to be a delivery destination in the reference information and delivers the information.

7. A content related information provision apparatus according to claim 1, wherein the information delivering means includes a characteristic amount of contents at a reference position in the contents in the reference information and delivers the characteristic amount.

8. A content related information provision apparatus according to claim 1, wherein the information delivering means delivers plural pieces of reference information collectively.

9. A content related information provision apparatus according to claim 1, wherein the information delivering means delivers the related information and/or the reference information in accordance with an HTTP (Hyper Text Transfer Protocol).

10. A content related information provision apparatus according to claim 1, wherein the information delivering means delivers the related information and/or the reference information in accordance with an SMTP (Simple Mail Transfer Protocol).

11. A content related information provision apparatus according to claim 1, wherein the information delivering means designates a character string, which is capable of identifying reference information, in a header of a delivery message at the time of delivery of reference information.

12. A content related information provision method that provides related information on contents including reference data arranged in time series, the method comprising:
    receiving related information on contents from one or more users, the related information including an identification of the contents, user remarks to the contents, and a reference time position of the user remarks relating to the contents;
    storing the received related information on contents;
    receiving reference information from one or more users, the reference information including a keyword specifying contents to be referred to by the user remarks to the contents, and specifying a time reference position in the contents;
    storing the received reference information;
    searching the stored related information for matching related information that matches at least one of the keyword or the time reference position of the reference information from the received reference information;
    delivering the matching related information for displaying on a display at a specific user device from among one or more user devices, and delivering at least one of the matching related information or the received reference information to the specific user device;
    specifying an installation region of a terminal apparatus of the one or more users to be a delivery destination according to the information delivering step, the installation region indicating a geographic region where the terminal apparatus of the one or more users is installed; and
    changing contents of related information and/or reference information, which should be delivered, according to the installation region, wherein the content referred to in the related information was already distributed or will be distributed to the specific user device.

13. A content related information provision method according to claim 12, wherein
the contents refer to a broadcast program, and
the reference information includes information specifying a broadcasting station, which broadcasts or has broadcasted a program, and information specifying a date and time when a reference part in a program is broadcasted or has been broadcasted.

14. A content related information provision method according to claim 12, wherein the reference information further includes information for specifying a broadcast starting date and time of the program and information for specifying a broadcast end time of a program or a length of the program.

15. A computer readable medium having a program recorded thereon written in a computer readable format so as to execute processing to perform a method for providing related information on contents including reference data arranged in time series on a computer system, said method comprising:
receiving related information on contents from one or more users, the related information including an identification of the contents, user remarks to the contents, and a reference time position of the user remarks relating to the contents;
storing the received related information on contents;
receiving reference information from one or more users, the reference information including a keyword specifying contents to be referred to by the user remarks to the contents, and specifying a time reference position in the contents;
storing the received reference information;
searching the stored related information for matching related information that matches at least one of the keyword or the time reference position of the reference information from the received reference information;
delivering the matching related information for displaying on a display at a specific user device from among one or more user devices, and delivering at least one of the matching related information or the received reference information to the specific user device;
specifying an installation region of a terminal apparatus of the one or more users to be a delivery destination according to the information delivering step, the installation region indicating a geographic region where the terminal apparatus of the one or more users is installed; and
changing contents of related information and/or reference information, which should be delivered, according to the installation region,
wherein the content referred to in the related information was already distributed or will be distributed to the specific user device.

16. A computer readable medium according to claim 15, wherein
the contents refer to a broadcast program, and
the reference information includes information specifying a broadcasting station, which broadcasts or has broadcasted a program, and information specifying a date and time when a reference part in a program is broadcasted or has been broadcasted.

17. A computer readable medium according to claim 15, wherein the reference information further includes information for specifying a broadcast starting date and time of the program and information for specifying a broadcast end time of a program or a length of the program.

18. A bulletin board system that supports information exchange for contents including reference data arranged in time series, the system comprising:
a related information receiver configured to receive related information from one or more user devices, the related information including an identification of the contents, user remarks to the contents, and a reference time position of the user remarks relating to the contents;
a related information storing unit configured to store the received related information;
a reference information receiver configured to receive reference information from the one or more user devices, the reference information including a keyword specifying contents to be referred to by the user remarks to the contents, and specifying a time reference position in the contents;
a reference information storing unit that stores the received reference information;
an information processing unit configured to search the related information storing unit for matching related information that matches at least one of the keyword or the time reference position of the reference information from the reference information receiver, and transmit the matching related information for displaying on a display at a specific user device from among said one or more user devices, and to transmit at least one of the matching related information or the stored reference information to the one or more user devices;
means that specifies an installation region of a terminal apparatus of the one or more user devices to be a provision destination of information, the installation region indicating a geographic region where the terminal apparatus of the one or more user devices is installed; and
means that changes contents of reference information according to the specified installation region,
wherein the content referred to in the matching related information was already distributed or will be distributed to the one or more user devices.

19. A bulletin board system according to claim 18, wherein
the contents refer to a broadcast program, and
the reference information includes information specifying a broadcasting station that broadcasts or has broadcasted a program, and information specifying a date and time when a reference part in the program is broadcasted or has been broadcasted.

20. A bulletin board system according to claim 19, wherein the reference information specifies a broadcasting station, which broadcasts or has broadcasted a program, using a channel number.

21. A bulletin board system according to claim 18, wherein the information processing unit is further configured to transmit a name of a bulletin board, in which a corresponding remark is written, with the name included in the reference information.

22. A bulletin board system according to claim 18, wherein the information processing unit is further configured to transmit corresponding remark contents with the user remarks included in the reference information.

23. A bulletin board system according to claim 18, wherein the information processing unit is further configured to include identification information of a site handling information resources related to contents in the reference information and delivers the identification information.

24. A bulletin board system according to claim 18, wherein the information processing unit is further configured to include information for correcting deviation of a clock in a terminal apparatus to be a delivery destination in the reference information and delivers the information.

25. A bulletin board system according to claim 18, wherein the information processing unit is further configured to include a characteristic amount of contents at a reference position in the contents in the reference information and delivers the characteristic amount.

26. A bulletin board system according to claim 18, wherein the information processing unit is further configured to deliver plural pieces of reference information collectively.

27. A bulletin board system according to claim 18, further comprising:
- a unit that, in writing of a remark, transmits an execution code for automatically acquiring reference information or urging a user to input a remark to a terminal apparatus side of a requiring source of the one or more user devices.

28. A bulletin board system according to claim 18, further comprising:
- a unit that, concerning an execution code for automatically acquiring reference information stored in a terminal apparatus of the requesting source of the one or more user devices in advance or urging a user to input a remark, transmits information necessary for starting the execution code to the terminal apparatus.

29. A bulletin board system according to claim 18, wherein the transmitting means delivers the reference information in accordance with an HTTP (Hyper Text Transfer Protocol).

30. A bulletin board system according to claim 18, wherein the information processing unit is configured to deliver the reference information in accordance with an SMTP (Simple Mail Transfer Protocol).

31. A bulletin board system according to claim 18, wherein the transmitting means designates a character string, which is capable of identifying the reference information, in a header of a delivery message at the time of delivery of reference information.

32. A bulletin board system according to claim 19, further comprising:
- a specification unit that, concerning a program series to be an object of an argument in a bulletin board, specifies a broadcast schedule for the next broadcast of the series; and
- a unit that transmits the broadcast schedule to a terminal apparatus of a request source of the one or more user devices.

33. A bulletin board system according to claim 32, further comprising:
- a setting unit that sets a bulletin board for each program series and performs download of the program schedule from a screen displaying information in the bulletin board or a screen displaying a list of the user remarks in the bulletin board.

34. A bulletin board system according to claim 19, further comprising:
- a specification unit a rebroadcast schedule for a program to be an object of a remark; and
- a unit that transmits the rebroadcast schedule to a terminal apparatus of a request source of the one or more user devices.

35. A bulletin board system according to claim 34, wherein the transmitting means transmits the rebroadcast schedule with the rebroadcast schedule included in reference information.

36. A bulletin board system according to claim 18, further comprising:
- a designation unit configured to designate retrieval conditions for a remark; and
- a retrieving unit configured to retrieve a remark across plural bulletin boards on the basis of the designated retrieval conditions.

37. A bulletin board system according to claim 36, wherein the bulletin board system uses a keyword included in a remark or designated separately at the time of writing the remark as retrieval conditions.

38. A bulletin board system according to claim 36, wherein the bulletin board system uses a name or an ID of a user who has written the remark as retrieval conditions.

39. A bulletin board system according to claim 36, wherein the bulletin board system uses a date and time when the remark is written as retrieval conditions.

* * * * *